(12) United States Patent  
Kameoka (10) Patent No.: US 7,316,596 B2
(45) Date of Patent: Jan. 8, 2008

(54) OUTBOARD MOTOR

(75) Inventor: Kentaro Kameoka, Shizuoka-ken (JP)

(73) Assignee: Yamaha Marine Kabushiki Kaisha (JP)

( * ) Notice: Subject to any disclaimer, the term of this patent is extended or adjusted under 35 U.S.C. 154(b) by 0 days.

(21) Appl. No.: 11/346,783

(22) Filed: Feb. 3, 2006

(65) Prior Publication Data

US 2006/0172631 A1    Aug. 3, 2006

(30) Foreign Application Priority Data

Feb. 3, 2005 (JP) .............................. 2005-027194

(51) Int. Cl.
*B63H 21/36* (2006.01)
(52) U.S. Cl. ...................................................... 440/77
(58) Field of Classification Search .................. 440/76, 440/77; 123/195 P
See application file for complete search history.

(56) References Cited

U.S. PATENT DOCUMENTS

| 4,930,790 A | * | 6/1990 | Sheridan | ...................... 277/630 |
| 5,018,998 A | * | 5/1991 | Kato | ............................ 440/77 |
| 5,025,763 A | * | 6/1991 | Watanabe | ............... 123/198 E |
| 5,096,208 A |  | 3/1992 | Westberg | |
| 5,135,239 A | * | 8/1992 | Kato et al. | ................... 277/645 |
| 6,190,219 B1 | * | 2/2001 | Meier et al. | ................... 440/77 |
| 6,699,083 B2 |  | 3/2004 | Rinzaka | |

FOREIGN PATENT DOCUMENTS

| JP | 02-292575 | 12/1990 |
| JP | 05-162692 | 6/1993 |
| JP | 5-162692 | 6/1993 |
| JP | 2002-240786 | 8/2002 |
| JP | 2002-349257 | 12/2002 |

OTHER PUBLICATIONS

Specification and Drawings of U.S. Appl. No. 11/320,217, filed Dec. 28, 2005.
Specification and Drawings of U.S. Appl. No. 11/320,371, filed Dec. 28, 2005.

* cited by examiner

*Primary Examiner*—Ed Swinehart
(74) *Attorney, Agent, or Firm*—Knobbe, Martens, Olson & Bear, LLP.

(57) ABSTRACT

An outboard motor has a cowling comprising a top cowl that is removably engagable with a bottom cowl. A mating portion of the top cowl and the bottom cowl is sealed when the top and bottom cowls are engaged so as to prevent or inhibit water from entering the cowling through the mating portion. A splash-proof rib portion is attached to an inner face of the top cowl and extends downwardly preferably around the entire periphery of the top cowl. The depending rib portion is disposed inside of the upper end of the bottom cowl when the top cowl is mounted on the bottom cowl.

21 Claims, 10 Drawing Sheets

FIG. 10

OUTBOARD MOTOR

CROSS-REFERENCE TO RELATED APPLICATIONS

This application claims priority to Japanese Patent No. JP2005-027194, which was filed on Feb. 3, 2005. The entirety of the priority application is hereby incorporated by reference.

BACKGROUND OF THE INVENTION

1. Field of the Invention

The present invention is related to outboard motors. More specifically, the present invention relates to to an outboard motor having a cowling comprising top and bottom cowls that are removably engageable with one another.

2. Description of the Related Art

Conventionally, an outboard motor has a sealed structure, in which almost all portions of the outboard motor including the engine are covered with a cover, since the outboard motor is exposed to the weather, seawater or the like when in use. Problems caused by the entry of seawater, river water, lake water, etc. (hereinafter referred to as "seawater or the like") into the outboard motor is thereby prevented or at least minimized.

The engine disposed of an outboard motor typically is enclosed within a cowling made up of a top cowl and a bottom cowl that are removably engaged with one another. A joint face or mating portion of the top cowl and the bottom cowl is generally provided with a sealing member for impeding the entry of water into the cowling.

Patent Document JP-A-Hei 5-162692 discloses an outboard motor cowling with a top cowl mounted to a bottom cowl. A sealing rubber has a first lip formed on the outer face of the sealing rubber for radially sealing the lower inner peripheral face of the top cowl and the bottom cowl, and a second lip formed at the lower outer peripheral area of the sealing rubber for vertically sealing the bottom end face of the top cowl and the bottom cowl.

JP-A-Hei 2-292575 discloses a bottom cowl for covering a lower portion of an engine, and a top cowl removably mounted on the top edge of the bottom cowl via a sealing member for covering an upper portion of the engine. The sealing member has a ring portion having a generally circular cross section, and a projecting portion integrally extending from a lower part of the ring portion.

JP-A-2002-240786 discloses an under cover for covering a lower half of an engine, and an engine cover removably mounted on an upward opening of the under cover via a sealing member for covering an upper half of the engine. The under cover and the engine cover has a first sealing face extending generally horizontally and a second sealing face extending generally vertically.

When the engine cover is mounted on the under cover, a vertical lip portion of a sealing member abuts against the first sealing face and a horizontal lip portion of the sealing member abuts against the second sealing face. In other words, the two lip portions abut against the two respective sealing faces perpendicular to each other.

SUMMARY OF THE INVENTION

Applicant has noted that, when the engine of an outboard motor is started and engine speed increases to a certain value, pressure within the cowling can change significantly between a positive and negative pressure. Even when there are sealing system as disclosed in the above patent documents, if the outboard motor is splashed by water from outside when a negative pressure is produced within the cowling, the water may more easily pass by the seals, enter the cowling, and be sprayed therefrom in the cowling.

Further, Applicant has noted that prior sealing systems may encounter problems that would compromise seal integrity such as, without limitation, sealing members deteriorate over time, which deterioration may be increased by vibrations and repeated removal and reinstallation of the top cowl; a top cowl made of resin material may be flexible, thus increasing vibrations which age the seal, and also resulting in occasional periods of minimal engagement with the seal; manufacturing variations in size of the top cowl and the bottom cowl due to tolerances results in variations in compression force required for good waterproof performance; sealing in only one direction provides no backup if the seal fails; and sealing members having complex shapes are especially prone to deterioration.

Accordingly, there is a need in the art for an outboard motor having a cowling structure that substantially prevents entry of water into the cowling through a mating portion of the top and bottom cowls having a reliable sealing structure. There is a further need for a structure that prevents water that may pass through the mating portion from spraying onto engine components due to negative pressure from engine air induction.

In accordance with one embodiment, the present invention provides an outboard motor having a cowling comprising a top cowl and a bottom cowl. A bottom portion of the top cowl is configured to engage an upper portion of the bottom cowl so that the top and bottom cowls are removably attached to one another. A rib portion extends from an inner face of the top cowl at or adjacent the top cowl bottom portion and extends downwardly around at least a majority of the periphery of the top cowl. At least part of the rib portion is positioned inside of the top end of the bottom cowl when the top cowl is mounted on the bottom cowl.

In another embodiment, the rib portion extends downwardly around substantially the entire periphery of the top cowl. In yet another embodiment, the rib portion is formed separately from the top cowl, and the rib portion comprises a mount portion connected to the inner face of the top cowl and a depending portion that extends downward from the mount portion.

In some embodiments, a horizontal sealing portion for effecting a water seal in a generally horizontal direction between the engaged top and bottom cowls is attached to an upper edge of the bottom cowl. In still other embodiments, a vertical sealing portion for effecting a water seal in a generally vertical direction between the engaged top and bottom cowls extends from the bottom portion of the top cowl.

In still another embodiment, the top cowl comprises a mounting face that is disposed generally transverse to the upper portion of the bottom cowl when the top and bottom cowls are engaged. A rib member comprising the rib portion and a mount portion is attached to the mounting face, and the rib portion extends generally downwardly from the mount portion.

Yet additional embodiments comprise a sealing member disposed on an upper edge of the bottom cowl. The sealing member comprises a generally vertically-directed sealing portion for vertically sealing the top cowl and the bottom cowl, a horizontally-directed sealing portion for horizontally sealing the top cowl and the bottom cowl, and a clip portion adapted to mount the sealing member to the bottom cowl.

The vertical sealing portion, the horizontal sealing portion, and the clip portion are formed together as one body.

In yet another embodiment, the rib portion is formed integrally with the top cowl.

In still further embodiments, the bottom portion of the top cowl overlaps the upper portion of the bottom cowl so that the upper portion of the bottom cowl is arranged inwardly relative to an outer side of the bottom cowl bottom portion and outwardly relative to the downwardly extending rib portion.

In accordance with another embodiment, the invention provides an outboard motor having a cowling enclosing an engine. The cowling comprises a top cowl and a bottom cowl. A bottom portion of the top cowl is configured to engage an upper portion of the bottom cowl so that the top and bottom cowls are removably attached to one another. The cowls engage one another about their periphery at a mating portion. Means are provided for effecting a seal in a first direction between the top and bottom cowls at the mating portion. Means are also provided for effecting a barrier between the mating portion and the engine so that there is not a straight path from the mating portion to the engine. The barrier means comprises means for directing water that may flow through the mating portion downwardly, and the barrier means is arranged around substantially the entire periphery of the cowling.

DETAILED DESCRIPTION OF PREFERRED EMBODIMENTS

Figure 1:
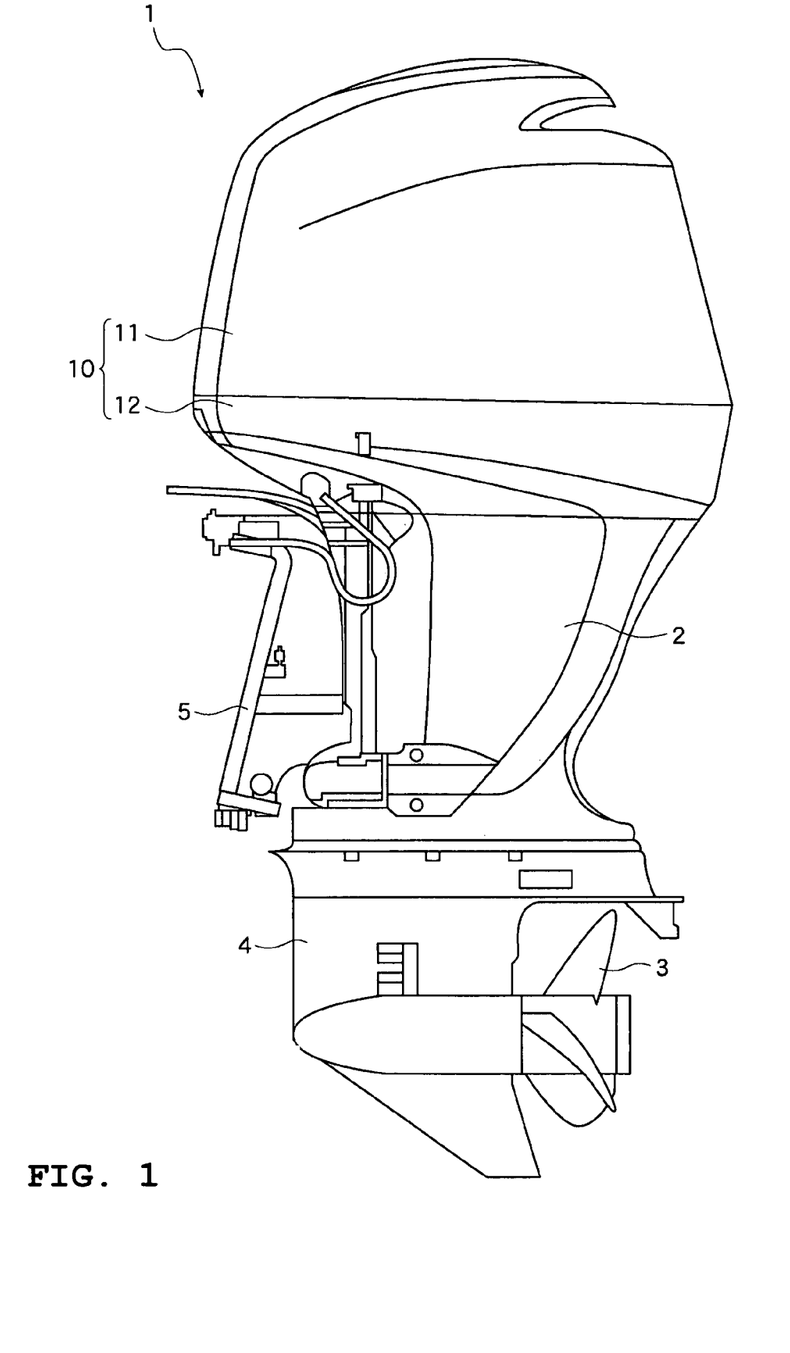
FIG. 1 is a side view of an outboard motor in accordance with an embodiment of the present invention.

With initial reference to FIG. 1, an outboard motor 1 preferably has a drive shaft housing 2, a gear casing 4, a cowling 10, and a mounting metal fitting 5. The gear casing 4 houses a gear mechanism for driving a propeller 3 for rotation and is coupled to a bottom portion of the drive shaft housing 2. The cowling 10 houses an engine (not shown) and is disposed on top of the drive shaft housing 2. The mounting metal fitting 5 is disposed forward of the drive shaft housing 2. The outboard motor 1 is mounted to a hull (not shown) with the mounting metal fitting 5. Preferably, the cowling 10 of the outboard motor 1 has a two-piece structure including a top cowl 11 and a bottom cowl 12 that are configured to engage one another so that the top cowl 11 is removably mounted on the bottom cowl 12.

Preferably, the top and bottom cowls engage each other at a mating portion, and a sealing structure is included at the mating portion to effect a generally water-tight seal so as to prevent or at least inhibit water from outside the cowling from passing through the mating portion and entering the engine compartment within the cowling.

Figure 2:
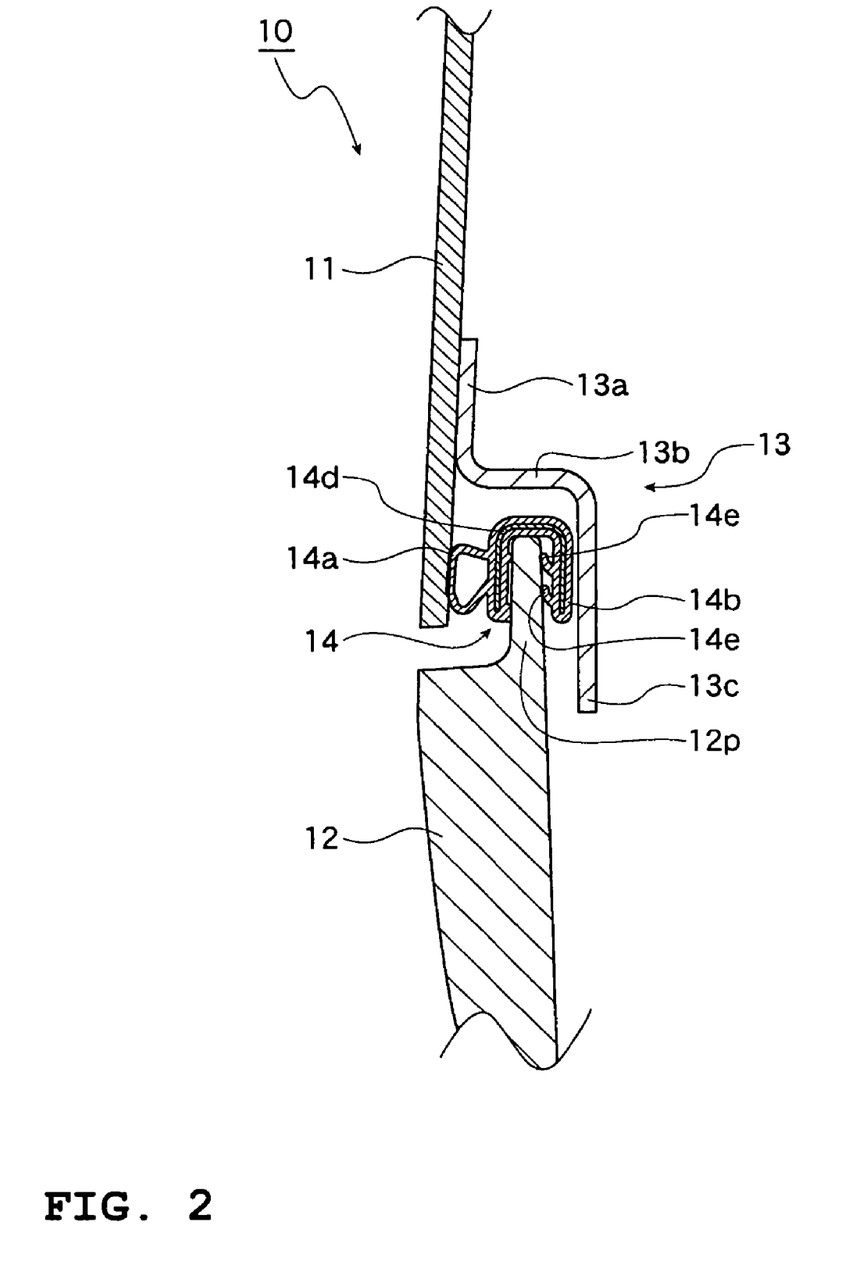
FIG. 2 is a sectional view of a portion of an outboard motor cowling showing engaged portions of top and bottom cowls configured in accordance with an embodiment.

FIG. 2 is a partial sectional view showing one embodiment of the mating portion. In the illustrated embodiment, the cowling 10 has a rib member 13 disposed on the inner face of the top cowl 11 on the bottom portion thereof. Preferably, the rib member 13 extends along substantially the entire periphery of the top cowl 11. However, it is to be understood that, in additional embodiments, the rib member 13 may not extend about the entire periphery, but preferably extends about at least a majority of the periphery of the top cowl 11 so as to assist in blocking entry of water through the mating portion over at least a majority of the mating portion.

The illustrated rib member 13 includes a mounting portion 13a, an opposing plate portion 13b, and a splash-proof rib portion 13c. The mounting portion 13a is a fixing portion and preferably is vertically affixed to the inner face of the top cowl 11 in the bottom portion thereof. The illustrated opposing plate portion 13b is bent and extends horizontally from the bottom end of the mounting portion 13a to oppose the top end 12p of the bottom cowl 12. The splash-proof rib portion 13c is bent and extends downward from an end of the opposing plate portion 13b.

The rib member 13 is formed to block seawater or the like that might enter the cowling 10 from between the top cowl 11 and the bottom cowl 12 and be sprayed from between a horizontal sealing portion 14a and the top cowl 11 due to a negative pressure produced in the cowling 10 with the operation of the engine, and to let such water run down along the splash-proof rib portion 13c. As such, the rib member 13 blocks such potential spray, absorbs its kinetic energy, and directs it downwardly and away from the engine.

The splash-proof rib portion 13c is formed to cover, together with the bottom end of the top cowl 11, a side part of the top end 12p of the bottom cowl 12 disposed below the top cowl 11.

with continued reference to FIG. 2, a sealing member 14 is disposed at the top end 12p of the bottom cowl 12. The top end 12p of the bottom cowl 12 is formed to project only on the inner peripheral side of the bottom cowl 12, and has a relatively small thickness so that the outer face of the top cowl 11 and the outer face of the bottom cowl 12 are generally flush with each other when the top cowl 11 is mounted on the bottom cowl 12.

The sealing member 14 preferably is made of an elastic material such as rubber. The sealing member 14 includes a horizontal sealing portion 14a for effecting a generally horizontally-directed seal between the top cowl 11, the bottom cowl 12, and a clip portion 14b having a generally squared U shape in cross section fitted onto the top end 12p of the bottom cowl 12.

In the illustrated embodiment, the horizontal sealing portion 14a has a hollow shape. The clip portion 14b preferably has a metal core member 14d therein. Pressing-contact lip parts 14e preferably are formed on the inner face of the clip portion 14b defining an opening so that the clip portion 14b can be fixed to the top end 12p of the bottom cowl 12 with the pressing-contact lip parts 14e. The horizontal sealing portion 14a extends outwardly from the clip portion 14b, and is configured to effect a horizontally-directed seal between the top cowl 11 and the bottom cowl 12 when the horizontal sealing portion 14a abuts against the inner face of the bottom portion of the top cowl 11. The opposing plate portion 13b of the rib member 13 is disposed above the clip portion 14b.

As shown in FIG. 2, when the top cowl 11 is mounted on the bottom cowl 12, the splash-proof rib portion 13c is positioned inside of the top end 12p of the bottom cowl 12, and depends to an elevation below the elevation of the upper edge of the bottom cowl 12. In the illustrated embodiment, the rib portion 13c depends to an elevation below the bottom edge of the top cowl 11.

During operation of the outboard motor, the engine, which is disposed within the cowling 10, draws in a significant amount of air during operation. Preferably, the outboard motor comprises an air intake system through which air from outside the cowling is communicated into the engine compartment and to the engine. However, even with efficient air intake systems, it is anticipated that sometimes, due to engine intake air requirements, a significant negative pressure will regenerate it within the cowling. When a negative pressure is produced in the cowling 10 with the operation of the engine, as the cowling 10 is impacted by strong wave action or splashing, seawater or the like attempts to enter the cowling 10 through a gap between the top cowl 11 and the bottom cowl 12, but is blocked from entering the cowling 10 by the horizontal sealing portion 14a, which is in contact with the bottom end of the top cowl 11.

However, especially when there is a negative pressure in the cowling 10, a portion of the seawater or the like may not be blocked by the horizontal sealing portion 14a, and may then pass through a gap between the opposing plate portion 13b and the clip portion 14b. However, such water then strikes the splash-proof rib portion 13c of the rib member 13, and then runs down along the splash-proof rib portion 13c or otherwise runs down along the inner face of the bottom cowl 12. Thus, when a negative pressure is produced in the cowling 10 with the operation of the engine, and a portion of outside water defeats the seal so as to pass by the seal and through the mating portion, the seawater or the like is prevented by the rib portion 13c from being sprayed into the cowling 10. Instead, water that enters the cowling is directed away from the engine, and is not drawn into the engine with intake air.

It is to be understood that various reasons may exist for water passing by the sealing members. For example, sealing performance may be reduced due to variations in the size of the top cowl 11 and bottom cowl 12 due to tolerances during manufacturing, seal member wear due to age, exposure, engine vibrations, repeated removal and reinstallation of the cowl 11, incorrect installation of the top cowl 11 onto the bottom cowl 12, damage from accidents exposure or the like, and other reasons.

In the illustrated embodiment, the bottom end of the top cowl 11 and the splash-proof rib portion 13c cover the top end 12p of the bottom cowl 12. Preferably, the upper portion 12p of the bottom cowl 12 is arranged generally in an inward position relative to an outer side of the top cowl 11 bottom portion, and is arranged in an outward position relative to the downwardly extending rib portion 13c. Preferably, the horizontal sealing portion 14a is elastic and is disposed on the top end 12p of the bottom cowl 12. Thus, the horizontal sealing portion 14a functions as a cushion member and prevents or inhibits horizontal displacement of the top cowl 11, so that the top cowl 11 is prevented or inhibited from bowing laterally. Horizontal sealing performance can thereby be improved.

In the illustrated preferred embodiment, the splash-proof rib portion 13c is formed on the rib member 13, which is formed separately from the top cowl 11. Thus, the rib member 13 is manufactured relatively easily and inexpensively. Also, the rib member 13 can be easily repaired or replaced in case of any damage. Further, the rib member 13 includes the mounting portion 13a, which is configured to be attached to the top cowl 11 on the bottom portion thereof. In addition to its other advantages, the rib member 13, reinforces and increases the rigidity of the top cowl 11. Such increased rigidity enhances predictability in size and shape, and further enhances performance of the seals. Of course, preferably, the sealing member 14 operates effectively so that no sea water or the like enters the cowling through the mating portion between the top and bottom cowls 11, 12.

In the embodiment illustrated in FIG. 2, the opposing plate portion 13b is disposed perpendicularly to the mounting portion 13a. However, the present invention is not limited to this embodiment. The opposing plate portion 13b may be disposed at certain angles other than 90 degrees relative to the mounting portion 13a, as long as the splash-proof rib portion 13c can prevent the spray of seawater or the like. In other words, the opposing plate portion 13b may be disposed to be inclined, curved, or the like as desired.

Further, in the illustrated embodiment, the cowling 10 has the continuous rib member 13 disposed on the inner face of the top cowl 11 on the bottom portion thereof, along the entire periphery of the top cowl 11. However, the present invention is not limited to this embodiment. The rib member 13 may be disposed along generally the entire periphery of the cowling 11, but may be discontinuous. For example, in one embodiment, the rib member 13 is disposed along at least a majority of the periphery of the cowling 11. In such an embodiment, the rib member 13 preferably is disposed along portions of the cowling that correspond to areas of greatest danger of water impacts or the like. Additionally, the rib member 13 may be disposed around portions of the cowling that have particular benefit in stiffening the top cowl 11 when using the rib 13.

Figure 3:
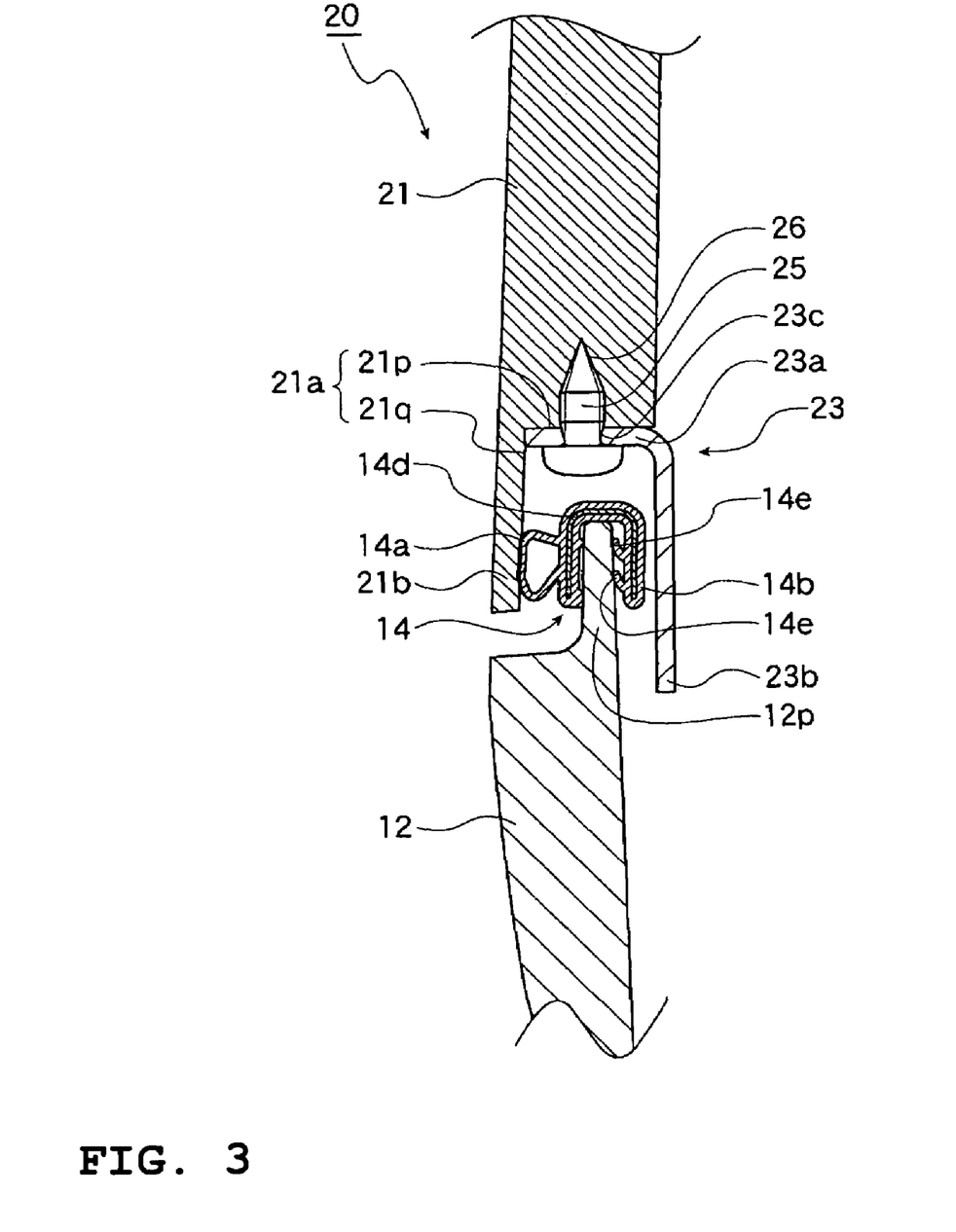
FIG. 3 is a sectional view showing engaged portions of top and bottom cowls configured in accordance with another embodiment.

With reference next to FIG. 3, another embodiment of the invention includes a top cowl 21 having a thickness greater than that of the top cowl 11 of the embodiment discussed above in connection with FIG. 2. An opposing mounting face 21p, which preferably is a flat surface that is generally perpendicular to the vertical inner face of the top cowl 21, is formed on the inner face of the top cowl 21 and close to the bottom end thereof. A rib member 23 preferably is disposed on the opposing face 21p.

Certain parts of the embodiment of FIG. 3 correspond to part of FIG. 2, and are denoted by the same reference numerals and described below.

As shown in FIG. 3, a cowling 20 has a recess 21a of a certain depth formed on the inner face of the top cowl 21 on the bottom portion thereof. The opposing mounting face 21p is formed on the recess 21a. The opposing face 21p is formed to oppose the top end 12p of the bottom cowl 12 when the top cowl 21 and the bottom cowl 12 are joined to each other. A rib member 23 preferably is fixed to the opposing face 21p. A lower side face 21q preferably is also formed on the recess 21a. As the horizontal sealing portion 14a abuts against the lower side face 21p, the top cowl 21 and the bottom cowl 12 are sealed horizontally.

The illustrated rib member 23 has an L-shaped cross section, and is affixed to the opposing face 21p. The rib member 23 includes a fixing portion 23a fixed to the opposing face 21p, a splash-proof rib portion 23b bent and extending downward from an end of the fixing portion 23a, and an insertion hole 23c formed in the fixing portion 23a. The rib member 23 is fixed to the opposing face 21p as a male screw 25 is fitted into a female thread 26 formed in the opposing face 21p through the insertion hole 23c of the rib member 23. Preferably, several insertion holes 23c and screws 25 are spaced apart about the periphery of the top cowl 21 so that the rib member 23 is securely attached to the top cowl 21 about its periphery.

As the recess 21a of a certain depth is formed on the inner face of the top cowl 21 on the bottom portion thereof, a projecting portion 21b preferably is defined at the bottom end of the top cowl 21 to extend downward of the top cowl 21 and outwardly of the upper portion 12p of the bottom cowl 12.

In the cowling 20, the splash-proof rib portion 23b is formed on the rib member 23 separate from the top cowl 21. The opposing face 21p opposing the top end 12p of the bottom cowl 12 when the top cowl 21 and the bottom cowl 12 are joined to each other is formed on the top cowl 21 on the bottom portion thereof. The rib member 23 includes the fixing portion 23a fixed to the opposing face 21p, and the splash-proof rib portion 23b bent and extending downward from an end of the fixing portion 23a. Thus, the rib member 23 can be easily fixed to the opposing face 21p via the fixing portion 23a and prevented from easily coming off, thereby increasing structural strength of the rib member 23 on the top cowl 21.

It is to be understood that the mount face 21p, though preferably substantially flat, can be formed differently. For example, in additional embodiments, the mount face 21p may be curved somewhat. In still further embodiments, the mount face 21p may be curved or flat, but is generally inclined so as not to be exactly perpendicular to the vertical interface of the top cowl 21. Rather, the mounting face 21p preferably is formed at some transverse position relative to either the vertical interface of the top cowl 21 or the generally vertical top end 12p of the bottom cowl 12 when the top and bottom cowls 21, 12 are joined together.

Figure 4:
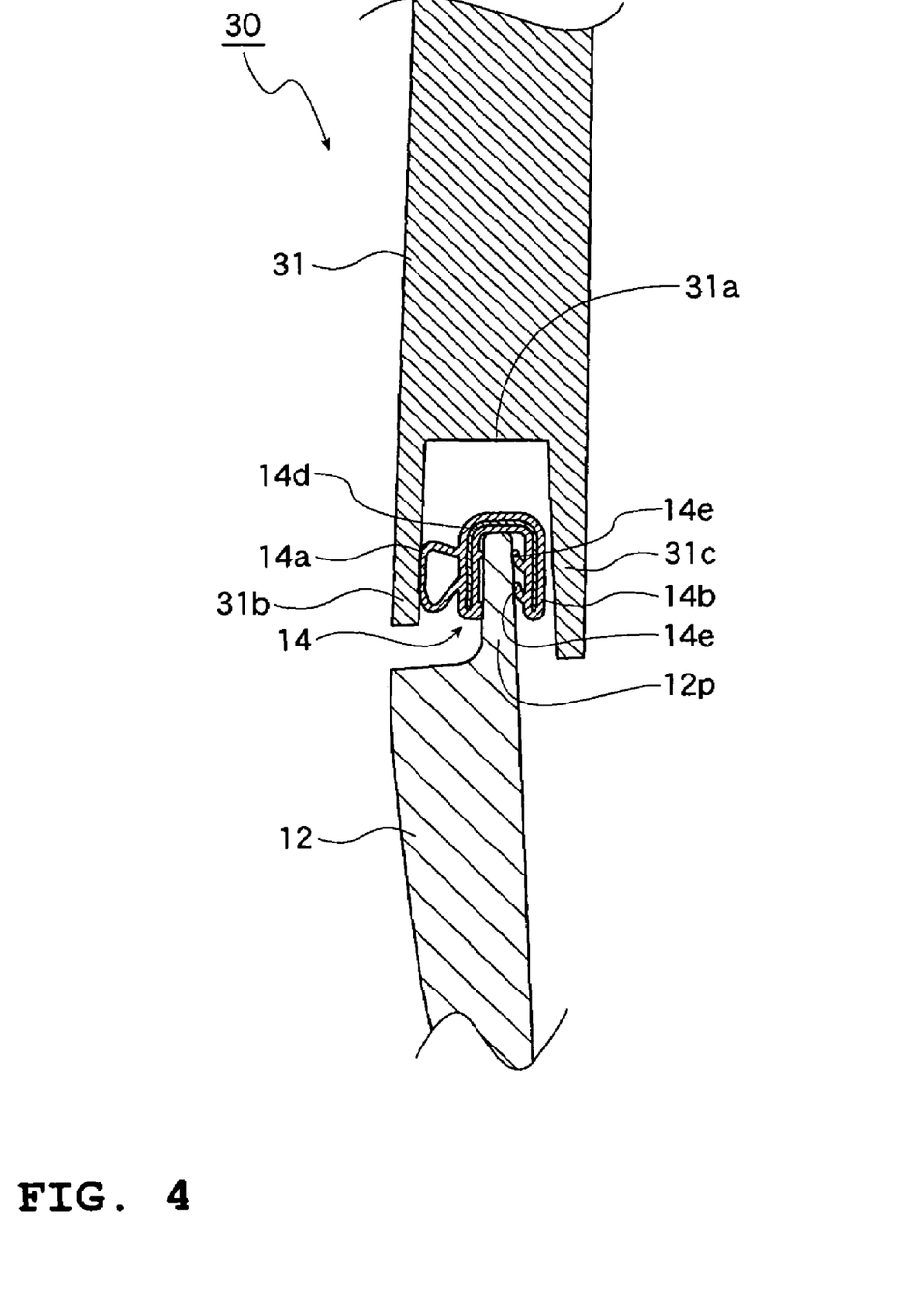
FIG. 4 is a sectional view showing engaged portions of top and bottom cowls configured in accordance with yet another embodiment.

With reference next to FIG. 4, another embodiment of the invention comprises a top cowl 31 and a splash-proof rib portion 31c that are formed together into one body.

Certain parts of the embodiments shown in FIGS. 2 and 3 correspond to the present embodiment, and are denoted by the same reference numerals and described below.

As shown in FIG. 4, a cowling 30 is formed with a projecting portion 31b and the splash-proof rib portion 31c both extending downward on the bottom portion of the top cowl 31. When the projecting portion 31b formed outside comes into contact with the horizontal sealing portion 14a, the top cowl 31 and the bottom cowl 12 are sealed horizontally. The projecting splash-proof rib portion 31c formed on the inside is designed to block seawater or the like that was not blocked by the horizontal sealing portion 14a so that such water is not sprayed on the engines, but is directed to run downward.

A recess ceiling face 31a is formed between the projecting portion 31b and the splash-proof rib portion 31c. As the top cowl 31 and the bottom cowl 12 are joined to each other, seawater or the like that was not blocked by the horizontal sealing portion 14a passes between the recess ceiling face 31a and the bottom-side sealing member 14 and reaches the splash-proof rib portion 31c.

In the cowling 30, since the splash-proof rib portion 31c is formed integrally with the top cowl 31, there is no need to provide the rib member 13 or 23 separately from the top cowl 31, thereby reducing the number of parts and man-hours required for mounting work.

Figure 5:
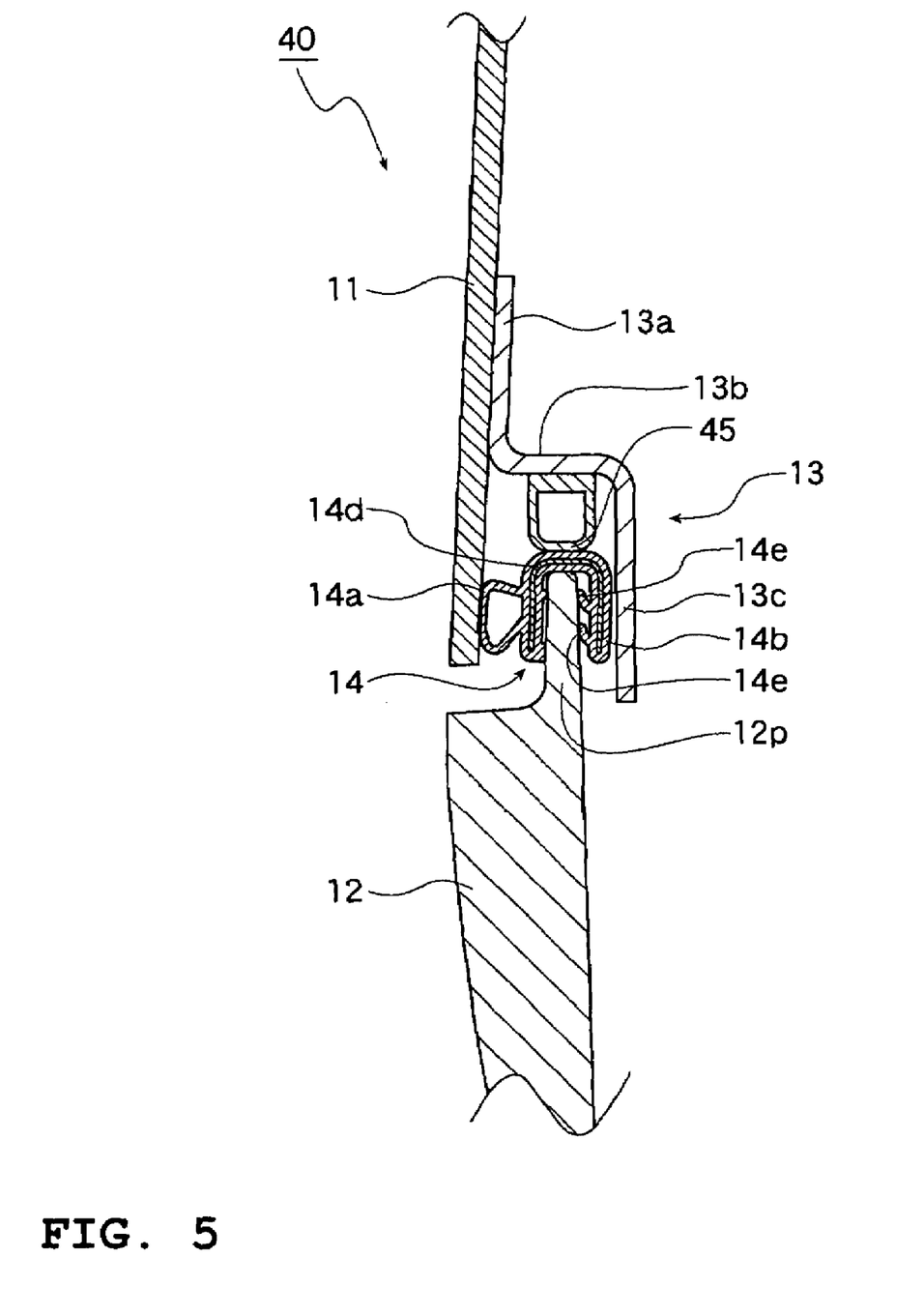
FIG. 5 is a sectional view showing engaged portions of top and bottom cowls configured in accordance with still another embodiment.

With next reference to FIG. 5, another embodiment of the invention comprises a cowling 40 and a vertical sealing portion 45 affixed to the rib member 13. The vertical sealing portion 45 preferably vertically seals the top cowl 11 and the bottom cowl 12.

Certain parts of the embodiments shown in FIG. 2 correspond to the present embodiment, and are denoted by the same reference numerals and described below.

Preferably, the vertical sealing portion 45 is made of an elastic material such as rubber and has a hollow shape. As such, an effective water seal is established between the bottom cowl 12 and the opposing portion 13b of the rib member 13.

During operation of the outboard motor, the engine, which is disposed within the cowling 10, draws in a significant amount of air during operation. Preferably, the outboard motor comprises an air intake system through which air from outside the cowling is communicated into the engine compartment and to the engine. However, even with efficient air intake systems, it is anticipated that sometimes, due to engine intake air requirements, a significant negative pressure will regenerate it within the cowling. When a negative pressure is produced in the cowling 10 with the operation of the engine, as the cowling 10 is impacted by strong wave action or splashing, seawater or the like attempts to enter the cowling 10 through a gap between the top cowl 11 and the bottom cowl 12, but is blocked from entering the cowling 10 by the horizontal sealing portion 14a, which is in contact with the bottom end of the top cowl 11.

If a portion of the seawater or the like was not blocked from entering the cowling 40 by the horizontal sealing portion 14a, it is then blocked by the vertical sealing portion 45, which is in contact with the clip portion 14b of the bottom-side sealing member 14 and the opposing member 13b of the rib 13.

If a portion of seawater or the like is not blocked by the vertical sealing portion 45, this water runs down along the splash-proof rib portion 13c of the rib member 13 or otherwise runs down along the inner face of the bottom cowl 12, and, though it enters the cowling 40, it is prevented from spraying onto the engine.

In the cowling 40, since the vertical sealing portion 45 for vertically sealing the top cowl 11 and the bottom cowl 12 is disposed on the top cowl 11 on the bottom portion thereof, if the top cowl 11 of the cowling 40 should bow laterally, sealing performance is not easily compromised or reduced. Provision of both horizontal and vertical sealing members provides excellent sealing protection for the cowling 40, and the rib portion 13c provides both additional stiffening for the top cowl 11 and additional protection for the engine within the cowling 40.

Figure 6:
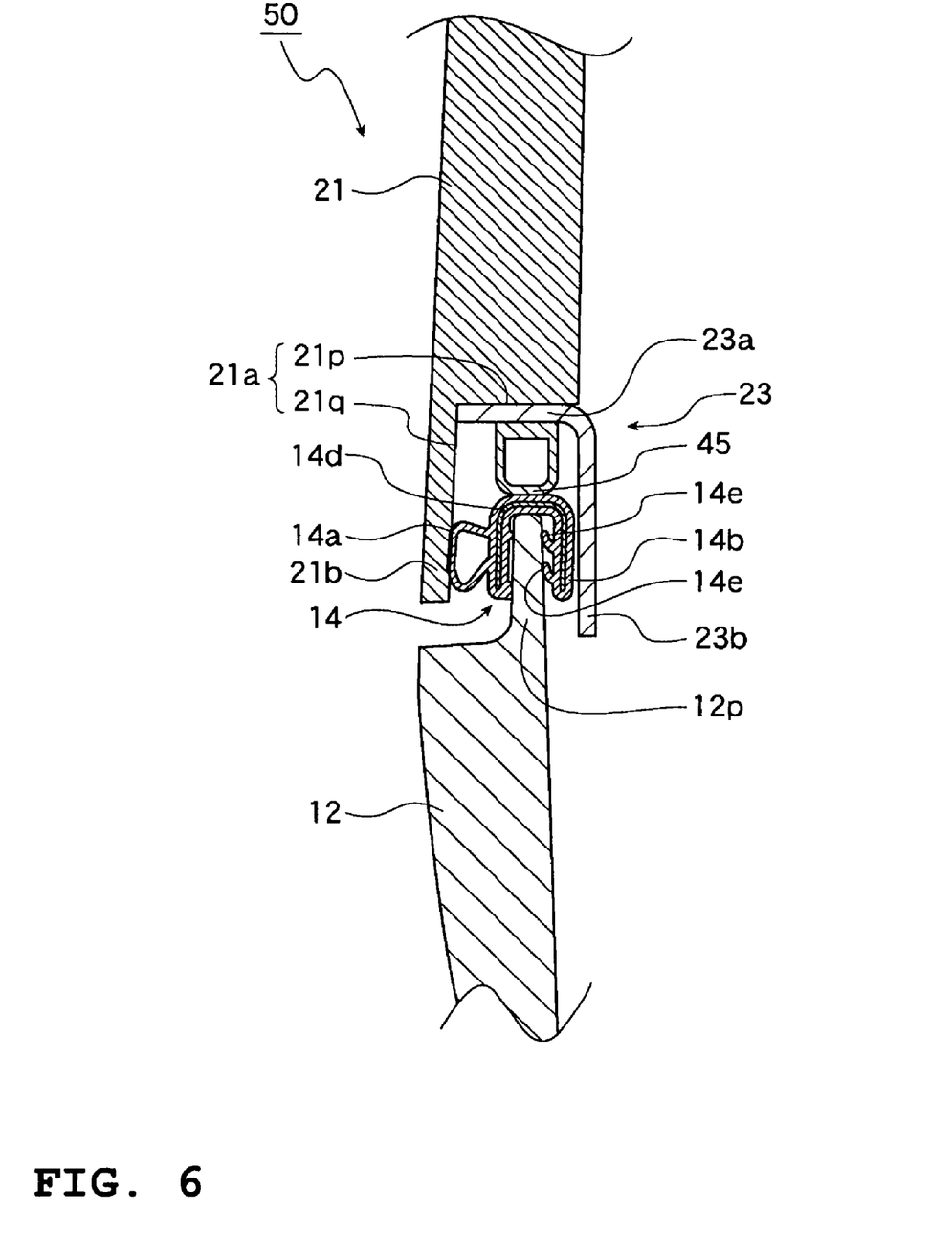
FIG. 6 is a sectional view showing engaged portions of top and bottom cowls configured in accordance with a further embodiment.

With next reference to FIG. 6, another embodiment of the invention comprises a cowling 50 and vertical sealing portion 45 affixed to the rib member 23. The vertical sealing portion 45 vertically seals the top cowl 21 and the bottom cowl 12.

Certain parts of the embodiments shown in FIG. 3 correspond to the present embodiment, and are denoted by the same reference numerals and described below.

Function and effect in the illustrated embodiment preferably are similar as discussed above in connection with FIG. 3. Vertical sealing preferably performs similar to that as discussed in connection with FIG. 5.

Figure 7:
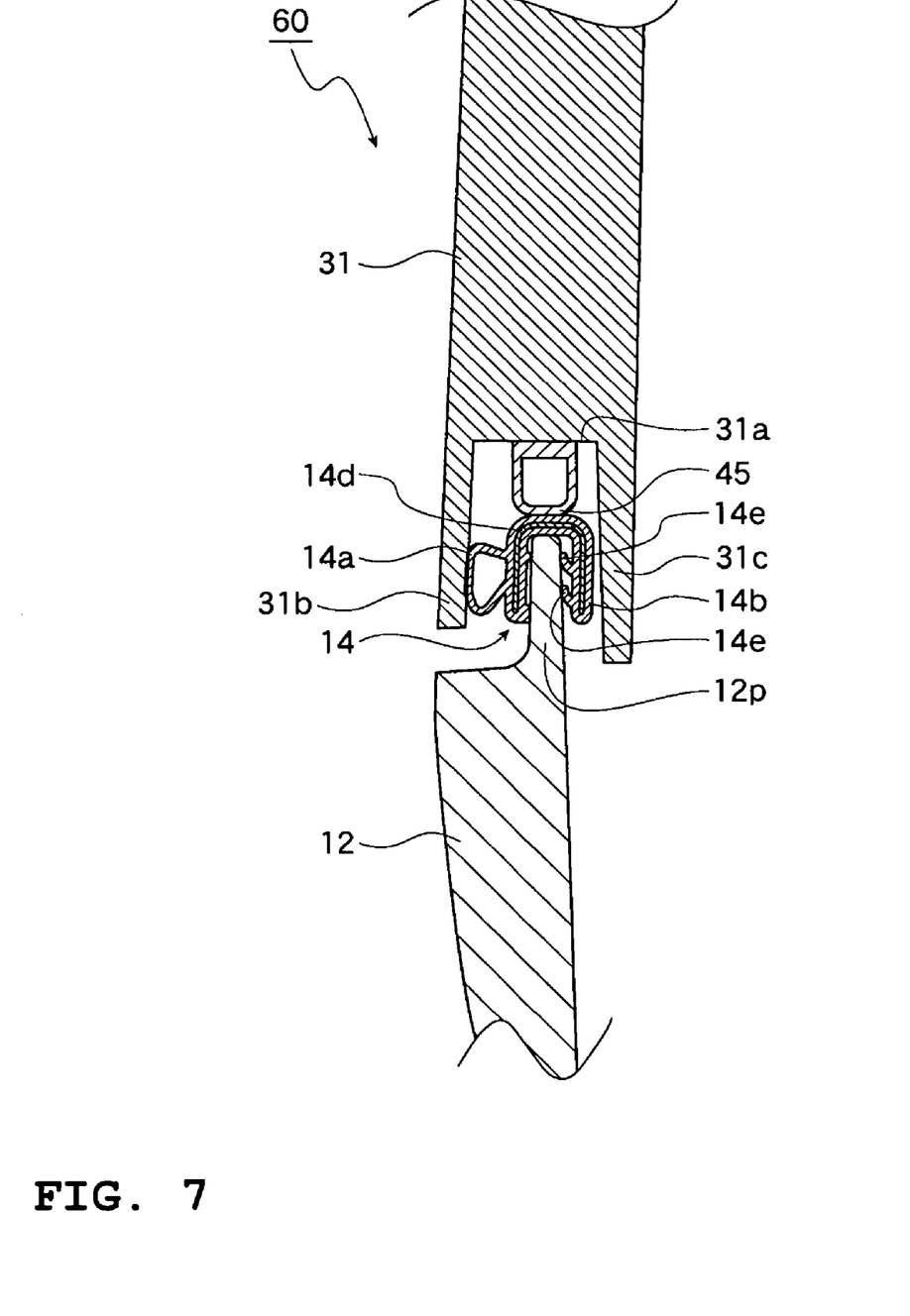
FIG. 7 is a sectional view showing engaged portions of top and bottom cowls configured in accordance with a yet further embodiment.

With reference next to FIG. 7, another embodiment of the invention comprises a cowling 60 and a vertical sealing portion 45 affixed to the recess 31a of the top cowl 31. The vertical sealing portion 45 vertically seals the top cowl 31 and the bottom cowl 12 in a manner similar to that discussed above in connection with FIG. 5.

Certain parts of the embodiments shown in FIG. 4 correspond to the present embodiment, and are denoted by the same reference numerals and described below.

Function and effect in the illustrated embodiment are similar to that as discussed above in connection with FIGS. 4 and 5 in that water that impinges on the cowling 60 is first blocked by horizontal and vertical seals, and then is blocked by a downwardly depending rib portion 31c.

Figure 8:
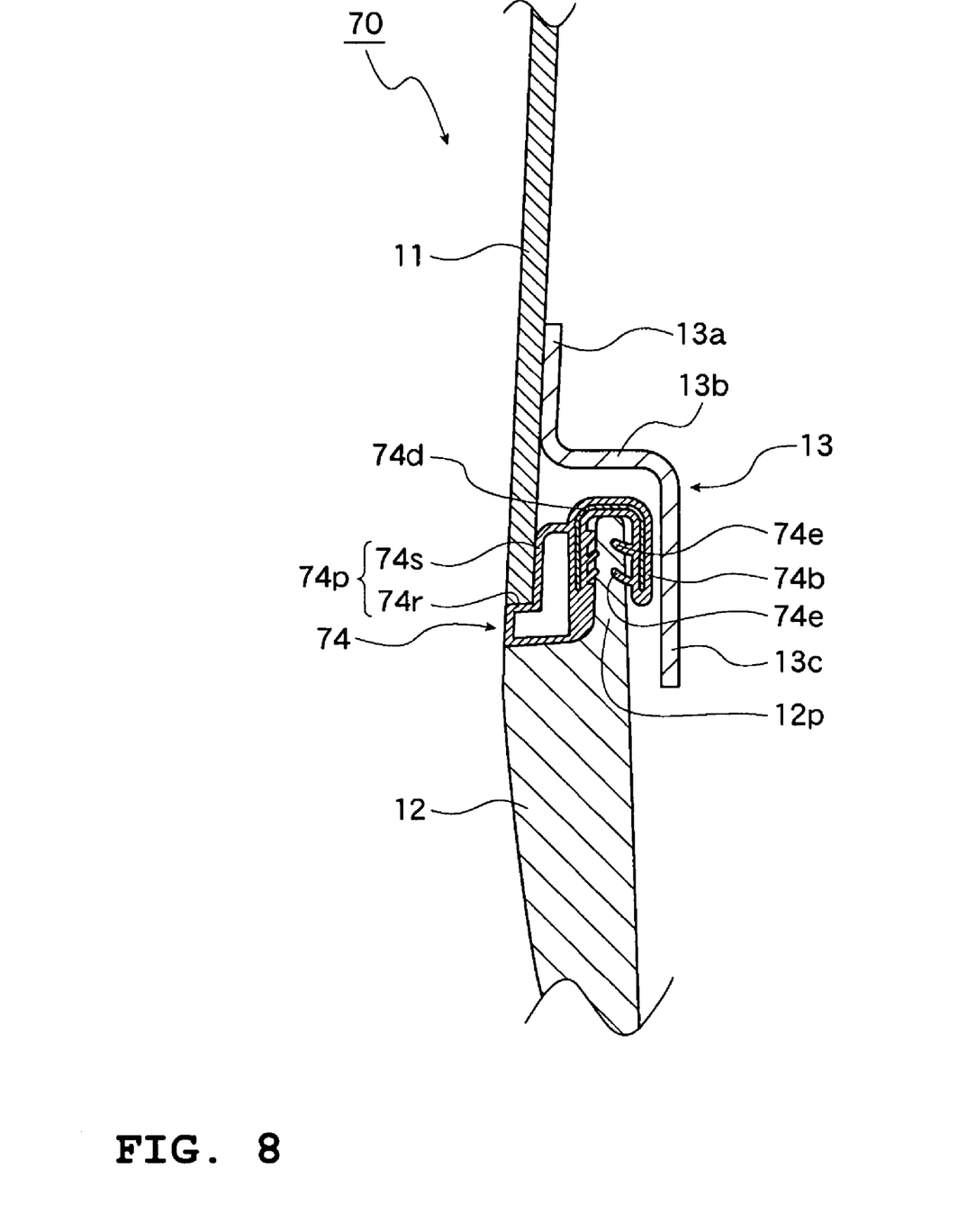
FIG. 8 is a sectional view showing engaged portions of top and bottom cowls configured in accordance with another embodiment.

With reference next to FIG. 8, another embodiment comprises a cowling 70 having an integral sealing member 74 disposed on the bottom cowl 12. The integral sealing member comprises a composite sealing member 74p having a vertical sealing component 74r and a horizontal sealing component 74s.

Certain parts of the embodiments shown in FIGS. 2 and 5 correspond to the present embodiment, and are denoted by the same reference numerals and described below.

As shown in FIG. 8, the integral sealing member 74 preferably is disposed on the top end 12p of the bottom cowl 12, and preferably includes the composite vertical and horizontal sealing portion 74p and a clip portion 74b for attaching the integral sealing member 74 to an upper edge of the bottom cowl 12. The composite vertical and horizontal sealing portion 74p preferably is made of an elastic material such as rubber and has a hollow shape. The vertical sealing component 74r preferably effects a generally vertically-directed water seal between the top cowl 11 and the bottom cowl 12; the horizontal sealing component 74s preferably effects a generally horizontally-directed water seal between the top cowl 11 and the bottom cowl 12. The vertical sealing portion 74r, horizontal sealing portion 74s, and clip portion 74b preferably are formed together into one body.

The illustrated clip portion 74b has the same structure as the clip portion 14b. Preferably, the core member 74d is similar to the core member 14d, and lip parts 74e are similar to lip parts 14e.

In operation, when the cowling 70 is impacted by a strong wave, seawater or the like that attempts to enter the cowling 70, such water preferably is first blocked by the vertical sealing portion 74r from passing between the top cowl 11 and the bottom cowl 12. If a portion of the seawater or the like is not blocked by the vertical sealing portion 74r, such water is then blocked by the horizontal sealing portion 74s. Seawater or the like that passes by both the vertical sealing portion 74r and the horizontal sealing portion 74s may enter the cowling 70, but strikes against the splash-proof rib portion 13c and runs down therealong rather than being sprayed (because of negative pressure within the cowling 70) onto the engine or into the engine's air intake.

In the cowling 70, since the vertical sealing portion 74r, horizontal sealing portion 74s, and clip portion 74b are formed with one member, the structure can be simplified and thus manufacturing can be easy.

Figure 9:
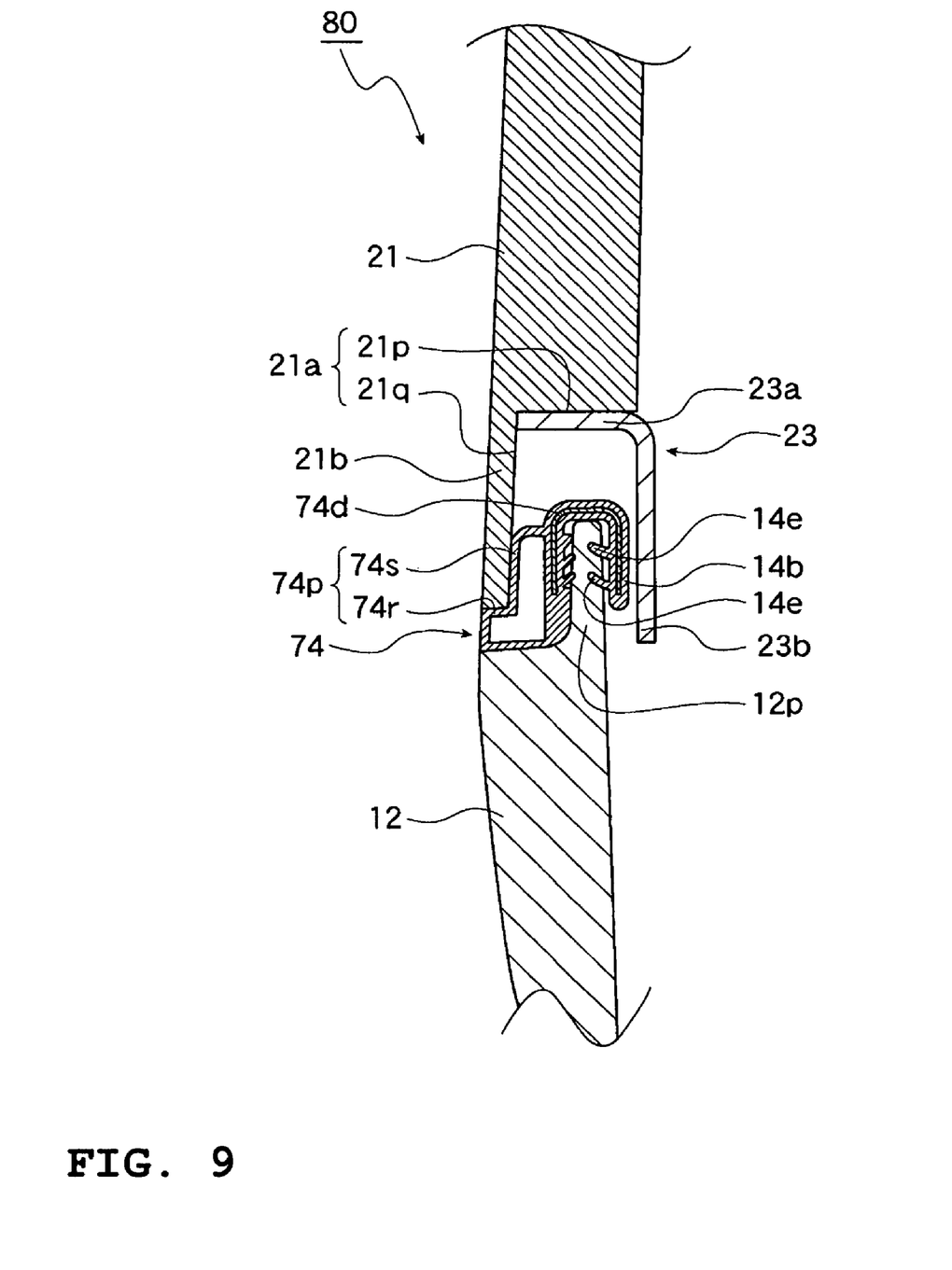
FIG. 9 is a sectional view showing engaged portions of top and bottom cowls configured in accordance with yet another embodiment.

With reference next to FIG. 9, another embodiment comprises a cowling 80 and an integral sealing member 74 disposed on the bottom cowl 12. The integral sealing member 74 preferably has a composite vertical and horizontal sealing portion 74p such as discussed above in connection with FIG. 8.

Certain parts of the embodiments shown in FIGS. 3 and 6 correspond to the present embodiment, and are denoted by the same reference numerals and described below. Also, the present embodiment shares certain functional characteristics with the embodiment discussed above in connection with FIG. 8.

Figure 10:
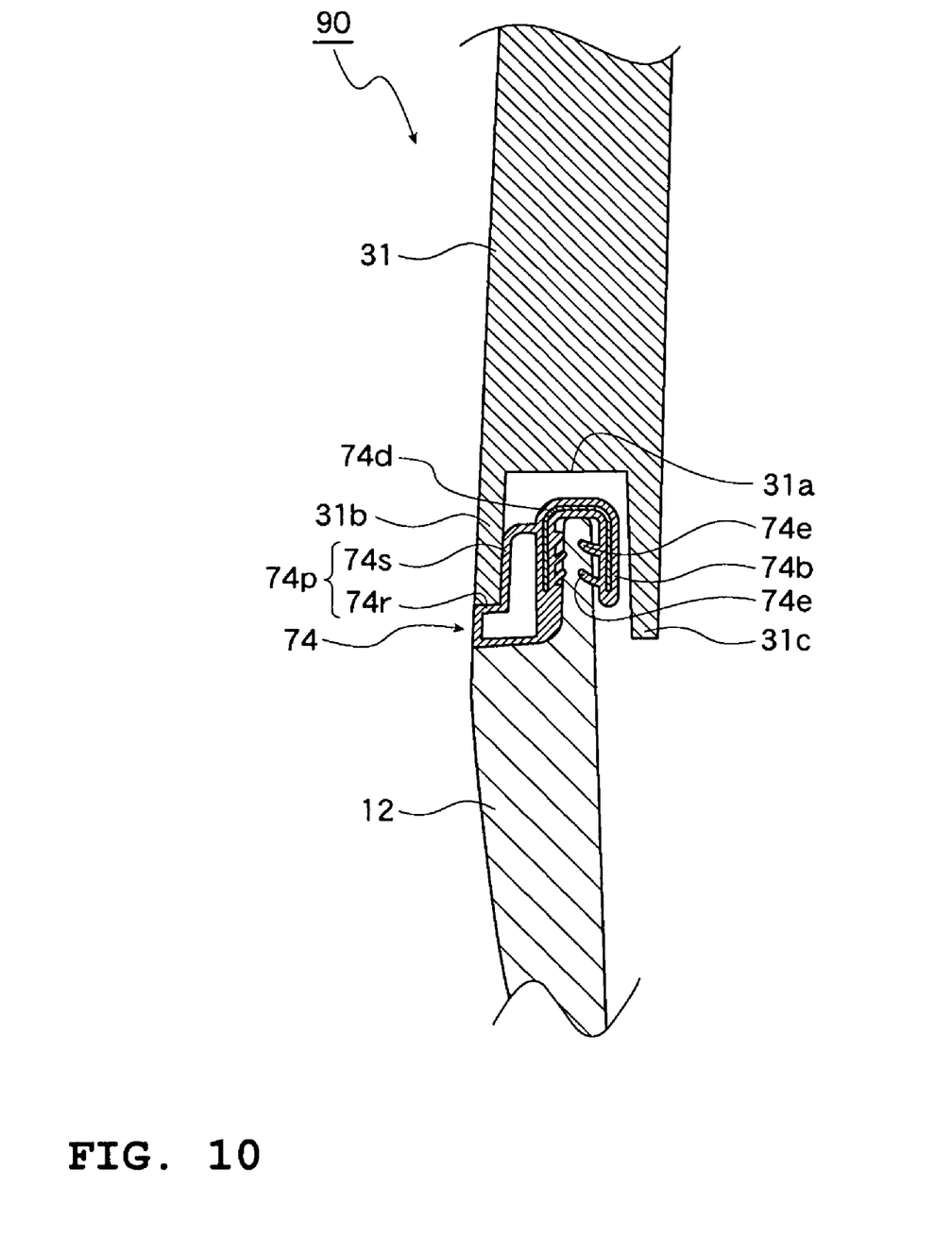
FIG. 10 is a sectional view showing engaged portions of top and bottom cowls configured in accordance with still another embodiment.

With reference next to FIG. 10, another embodiment comprises a cowling 90 and an integral sealing member 74 disposed on the bottom cowl 12. Preferably, the integral sealing member 74 has a composite vertical and horizontal sealing portion 74p such as in the embodiment discussed above in connection with FIG. 8.

Certain parts of the embodiments shown in FIGS. 4 and 7 correspond to the present embodiment, and are denoted by the same reference numerals and described below. Also, the present embodiment shares certain functional characteristics with the embodiments discussed above in connection with FIGS. 8 and 9.

This specification has referred to horizontal and vertical seals. As indicated by the context and drawings, such terms have reference to the general direction in which the sealing member extends as it contacts the respective cowls. These terms were especially helpful in illustrating that, for instance, a "horizontal" seal is in a direction generally transverse to a "vertical" seal, thus enhancing sealing. It is to be understood, however, that the terms "horizontal" and "vertical" should not be rigidly construed, but are general terms. For instance, a "horizontal" seal need not be perfectly horizontal, but has a greater horizontal vector component than vertical vector component. Similarly, a "vertical" seal need not be perfectly vertical, but has a vertical vector component that is greater than its horizontal vector component. Also, "horizontal" and "vertical" seals need not be perpendicular to one another, but should be generally transverse to one another.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. For example, another embodiment may employ structure as in FIG. 8 and may also employ a supplemental vertical seal 45 as in FIG. 5. Thus, it is intended that the scope of the present invention herein disclosed should not be limited by the particular disclosed embodiments described above, but should be determined only by a fair reading of the claims that follow.

What is claimed is:

1. An outboard motor having a cowling comprising a top cowl and a bottom cowl, the top cowl having an exterior surface and an interior surface, a bottom portion of the top cowl configured to mate with an upper portion of the bottom cowl so that the top and bottom cowls are removably attached to one another, the top cowl having an outer bottom edge at a bottom of the exterior surface, and a rib portion connected to the interior surface at a mount part that is vertically spaced from the outer bottom edge, the rib portion extending downwardly around at least a majority of the periphery of the top cowl, wherein at least part of the rib portion is positioned inside of the top end of the bottom cowl when the top cowl is mounted on the bottom cowl.

2. The outboard motor according to claim 1, wherein the rib portion extends downwardly around substantially the entire periphery of the top cowl.

3. The outboard motor according to claim 1, wherein the rib portion is formed separately from the top cowl, and the rib portion comprises a mount portion connected to the inner face of the top cowl at the mount part and a depending portion that extends downward from the mount portion.

4. The outboard motor according to claim 3, wherein the depending portion is bent relative to the mount portion.

5. The outboard motor according to claim 3, wherein a horizontal sealing portion for effecting a water seal in a generally horizontal direction between the mated top and bottom cowls is attached to an upper edge of the bottom cowl.

6. The outboard motor according to claim 5, wherein a vertical sealing portion for effecting a water seal in a generally vertical direction between the mated top and bottom cowls extends from the bottom portion of the top cowl.

7. The outboard motor according to claim 1, wherein the top cowl comprises a mounting face that is disposed generally transverse to the upper portion of the bottom cowl when the top and bottom cowls are mated together, and additionally comprising a rib member comprising the rib portion and a mount portion that is attached to the mounting face, the rib portion extending generally downwardly from the mount portion.

8. The outboard motor according to claim 7, wherein a horizontal sealing portion for effecting a water seal in a generally horizontal direction between the mated together top and bottom cowls is attached to an upper edge of the bottom cowl.

9. The outboard motor according to claim 8 additionally comprising a vertical sealing portion for effecting a water seal in a generally vertical direction between the mated together top and bottom cowls, the vertical sealing portion extending between the mount surface and the upper portion of the bottom cowl.

10. The outboard motor according to claim 7 additionally comprising a sealing member disposed on an upper edge of the bottom cowl, the sealing member comprising a generally vertically-directed sealing portion for vertically sealing the top cowl and the bottom cowl, a horizontally-directed sealing portion for horizontally sealing the top cowl and the bottom cowl, and a clip portion adapted to mount the sealing member to the bottom cowl, wherein the vertical sealing portion, the horizontal sealing portion, and the clip portion are formed together as one body.

11. The outboard motor according to claim 1, wherein the rib portion is formed integrally with the top cowl.

12. The outboard motor according to claim 11 additionally comprising a sealing member disposed on an upper edge of the bottom cowl, the sealing member comprising a generally vertically-directed sealing portion for vertically sealing the top cowl and the bottom cowl, a horizontally-directed sealing portion for horizontally sealing the top cowl and the bottom cowl, and a clip portion adapted to mount the sealing member to the bottom cowl, wherein the vertical sealing portion, the horizontal sealing portion, and the clip portion are formed together as one body.

13. The outboard motor according to claim 1, wherein a horizontal sealing portion for effecting a water seal in a generally horizontal direction between the mated top and bottom cowls is attached to an upper edge of the bottom cowl.

14. The outboard motor according to claim 13, wherein a vertical sealing portion for effecting a water seal in a generally vertical direction between the mated top and bottom cowls extends from the bottom portion of the top cowl.

15. The outboard motor according to claim 1, wherein the bottom portion of the top cowl overlaps the upper portion of the bottom cowl so that the upper portion of the bottom cowl is arranged inwardly relative to an outer side of the top cowl bottom portion and outwardly relative to the downwardly extending rib portion.

16. The outboard motor according to claim 15 additionally comprising a sealing member disposed on an upper edge of the bottom cowl, the sealing member comprising a generally vertically-directed sealing portion for vertically sealing the top cowl and the bottom cowl, a horizontally-directed sealing portion for horizontally sealing the top cowl and the bottom cowl, and a clip portion adapted to mount the sealing member to the bottom cowl, wherein the vertical sealing portion, the horizontal sealing portion, and the clip portion are formed together as one body.

17. The outboard motor according to claim 1 additionally comprising a sealing member disposed on an upper edge of the bottom cowl, the sealing member comprising a generally vertically-directed sealing portion for vertically sealing the top cowl and the bottom cowl, a horizontally-directed sealing portion for horizontally sealing the top cowl and the bottom cowl, and a clip portion adapted to mount the sealing member to the bottom cowl, wherein the vertical sealing portion, the horizontal sealing portion, and the clip portion are formed together as one body.

18. The outboard motor according to claim 15, wherein the rib has a bottom edge, and the bottom edge of the rib is vertically lower than the outer bottom edge of the top cowl.

19. An outboard motor having a cowling enclosing an engine, the cowling comprising a top cowl and a bottom cowl, a bottom portion of the top cowl configured to mate with an upper portion of the bottom cowl so that the top and bottom cowls are removably attached to one another, the cowls mating with one another about their periphery at a mating portion, means for effecting a seal in a first direction between the top and bottom cowls at the mating portion, means for effecting a barrier between the mating portion and the engine so that there is not a straight path from the mating portion to the engine, the barrier means comprising means for directing water that may flow through the mating portion downwardly, the barrier means being arranged around substantially the entire periphery of the cowling, wherein the barrier means comprises a rib depending from an interior surface of the top cowl, the rib attached to the top cowl at a mount part that is vertically spaced from a bottom edge of an outer surface of the top cowl.

20. An outboard motor as in claim 19, wherein the barrier means depends from the top cowl.

21. An outboard motor as in claim 20 additionally comprising means for effecting a seal in a second direction between the top and bottom cowls at the mating portion, the second direction being generally transverse to the first direction.

* * * * *